United States Patent
Singarella et al.

[11] Patent Number: 6,029,509
[45] Date of Patent: Feb. 29, 2000

[54] DIPSTICK DEVICE WITH INTERGRAL WIPING SYSTEM

[76] Inventors: Christopher Frank Singarella, 56 Middle Rd., Ellington, Conn. 06029; Steven Anthony Reed, 28 Tim Clark Cir., Simsbury, Conn. 06070

[21] Appl. No.: 08/949,175

[22] Filed: Oct. 10, 1997

[51] Int. Cl.[7] .................................................. F01M 11/12
[52] U.S. Cl. ............................................ 73/116; 15/220.4
[58] Field of Search .......................... 73/116, 40, 40.5 R, 73/49.7, 49.8, 52, 112, 113, 117.2, 118.1, 119 R, 426, 428; 15/220.4

[56] References Cited

U.S. PATENT DOCUMENTS

| | | |
|---|---|---|
| 1,814,075 | 7/1931 | Burkhardt . |
| 2,036,889 | 4/1936 | Sample . |
| 2,127,835 | 8/1938 | Tower . |
| 2,314,430 | 3/1943 | Smith . |
| 2,453,452 | 11/1948 | Nielsen . |
| 2,504,563 | 4/1950 | Menke . |
| 2,738,587 | 3/1956 | Nelson . |
| 2,773,277 | 12/1956 | Souter ..................................... 15/220.4 |
| 3,387,314 | 6/1968 | Shirk ....................................... 15/220.4 |
| 3,626,540 | 12/1971 | Rood ....................................... 15/220.4 |
| 4,110,909 | 9/1978 | Mayr et al. . |
| 4,419,781 | 12/1983 | Meegan ................................... 15/220.4 |
| 4,422,204 | 12/1983 | Long, Jr. ................................. 15/220.4 |
| 4,506,402 | 3/1985 | Long, Jr. ................................. 15/220.4 |
| 4,716,615 | 1/1988 | Whitehead et al. .................... 15/220.4 |

FOREIGN PATENT DOCUMENTS

| | | |
|---|---|---|
| 1090791 | 4/1955 | France . |
| 26 10 164 | 9/1977 | Germany . |
| 743589 | 1/1956 | United Kingdom . |
| 779962 | 7/1957 | United Kingdom . |

*Primary Examiner*—Eric S. McCall
*Attorney, Agent, or Firm*—Cantor Colburn LLP

[57] ABSTRACT

A dipstick device with an integral wiper system is provided which comprises a wiping button which automatically resets the mechanism after actuating switch (i.e., a button) is pressed down to release a spring loaded dipstick tube guide which in turn moves in an upward direction to expose the dipstick to an elastomeric wiping assembly which wipes the dipstick as the dipstick is withdrawn from the dipstick tube guide.

15 Claims, 6 Drawing Sheets

FIG. 6
(SECTION C-C)

FIG. 7

FIG. 8
(SECTION E-E)

FIG. 9

DIPSTICK DEVICE WITH INTERGRAL WIPING SYSTEM

BACKGROUND OF THE INVENTION

This invention relates generally to oil level dipstick measuring devices. More particularly, this invention relates to a dipstick measuring device equipped with an integral wiping system.

Dipstick measuring devices which measure the oil level in the crankcase of an internal combustion engine of the type described herein are well known and used in a variety of applications such as automobiles, trucks, buses, farming and construction equipment. Additionally, there are many smaller engines that are used in lawn mowers, garden tractors and landscape equipment. Regardless of the size of the engine, all of these engines have the common need for checking the crankcase oil level on a frequent basis to assure that the oil levels are sufficient to protect the engine parts when operating.

Most prior art dipstick systems require the use of a wiping medium to wipe the dipstick clean and then, of course, there is a need to dispose of the wiping medium or cloth. As is well known, the dipstick is inserted into the dipstick tube, pulled out for visual inspection and then reinserted into the engine. The above can also be a messy procedure for the operator. This fact leads to a new problem that now exists in that many motorists self fuel their vehicles. It will be appreciated that these motorists are reluctant to check the oil level in the engine for fear of soiling their clothes.

Still another problem is that the used motor oil and wiping media eventually find their way to sanitary landfills or must be shipped to redemption centers for expensive processing (that is, the wiping media, i.e., "oily" rags or paper towels must be processed).

It is known that motor oil can seep into water aquifers via these landfills and can be detrimental to the environment. According to EPA Publication 625-R9401D, entitled *Environmental Regulations and Technologies, Managing Used Oil*, Page 4 " . . . 1 gallon of used motor oil seeping into an aquifer can contaminate as much as 1,000,000 gallons of water . . . ". Thus, it can be seen that the simple act of periodically checking the oil level of an internal combustion engine can lead to a sizable environmental problem. This is a particularly significant problem given the large number of vehicles (i.e., close to two hundred million registered vehicles in 1993 alone with the total number of non registered engines in existence being many times the number of registered vehicles), and therefore, the potential environmental impact being extremely great.

In fact, this environmental impact can actually be quantified as follows. First, assume that each vehicle engine oil level is checked once a month. It is known that a typical dipstick retains four drops of 10–40 motor oil which equates to 0.1 cc of oil with is equal to 0.00002642 gallons. The amount of oil placed into the environment as a result of conventional dipstick measuring is therefore the amount of oil wiped off per check, multiplied by the frequency of checks per year multiplied by the quantity of total vehicles.

Therefore, 0.00002642 gallons per check times 12 checks per year times 200,000,000 vehicles is equal to 63,408 gallons of oil per year which potentially reaches landfills each year with the potential contamination of one million gallons of water per gallon of waste oil or a total of 63,408,000,000 gallons of water contaminated every year. In other words, more than 63 billion gallons of water could be saved from contamination as a result of the prior art method of checking crank case oil levels. It should be reiterated that this figure is actually much higher when all the non registered engines as well as equipment engines that exist are added to the foregoing calculations.

Although there have been attempts in the prior art to provide some sort of mechanism to self wipe the dipstick to save time and provide convenience in using a self-cleaning mechanism, all of these prior art devices have exhibited problems and deficiencies.

Prior art examples of self-wiping dipstick measurement devices include U.S. Pat. No. 1,814,075 to Burkhardt; U.S. Pat. No. 2,127,835 to Tower and U.S. Pat. No. 4,110,909 to Mayr et al; British Patent No. 779,626; French Patent No. 1,090,791 and German Patent No. 2,610,164.

However, all of these prior art devices suffer from certain deficiencies and limitations; and there is a clear need for improved self-wiping dipstick measuring machines.

That is, it would appear that in lieu of modern environmental concerns, economy and convenience, there is a perceived need for an improved automatic wiping dipstick in the art.

SUMMARY OF THE INVENTION

The above-discussed and other problems and deficiencies of the prior art are overcome or alleviated by the dipstick device with an integral wiping system of the present invention. In accordance with the present invention, a low cost dipstick device with integral wiper system is provided which comprises a wiping button which automatically resets the mechanism after actuating switch (i.e., a button) is pressed down to release a spring loaded dipstick tube guide which in turn moves in an upward direction to expose the dipstick to an elastomeric wiping assembly which wipes the dipstick as the dipstick is withdrawn from the dipstick tube guide.

This, in turn, allows the dipstick to be withdrawn from the dipstick tube showing the level of oil in the crank case upon inspection. After inspection, the dipstick is returned to its original position. Should another inspection be required, the process is repeated.

The major advantages of this invention are the elimination of the wiping operation with a soiled rag and/or towel paper (i.e., wiping media), a one hand operation, as well as providing time saving, neatness and clean inspection to the person checking the oil level. The novel use of the elastomeric assembly compensates for normal wear. Additionally, the dipstick can be inserted in any orientation and accommodates the normal rotation imparted by the hand of the operator and wipes any shaped dipstick.

The above-discussed and other feature and advantages of the present invention will be appreciated and understood by those of ordinary skill in the art from the following detailed discussion and drawings.

BRIEF DESCRIPTION OF THE DRAWINGS

Referring now to the drawings, wherein like elements are numbered alike in the several FIGURES.

DESCRIPTION OF THE PREFERRED EMBODIMENT

Figure 1:
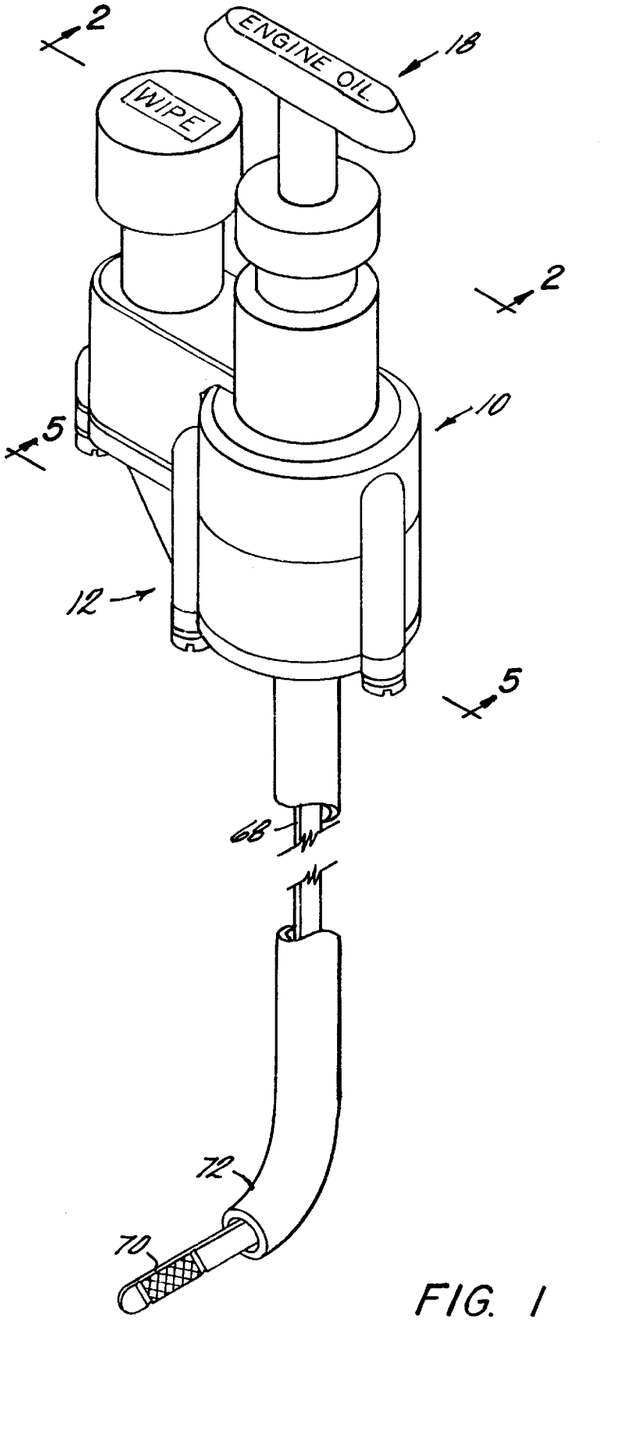
FIG. 1 is a perspective view of a dipstick device with integral wiping system in accordance with the present invention.
Figure 2:
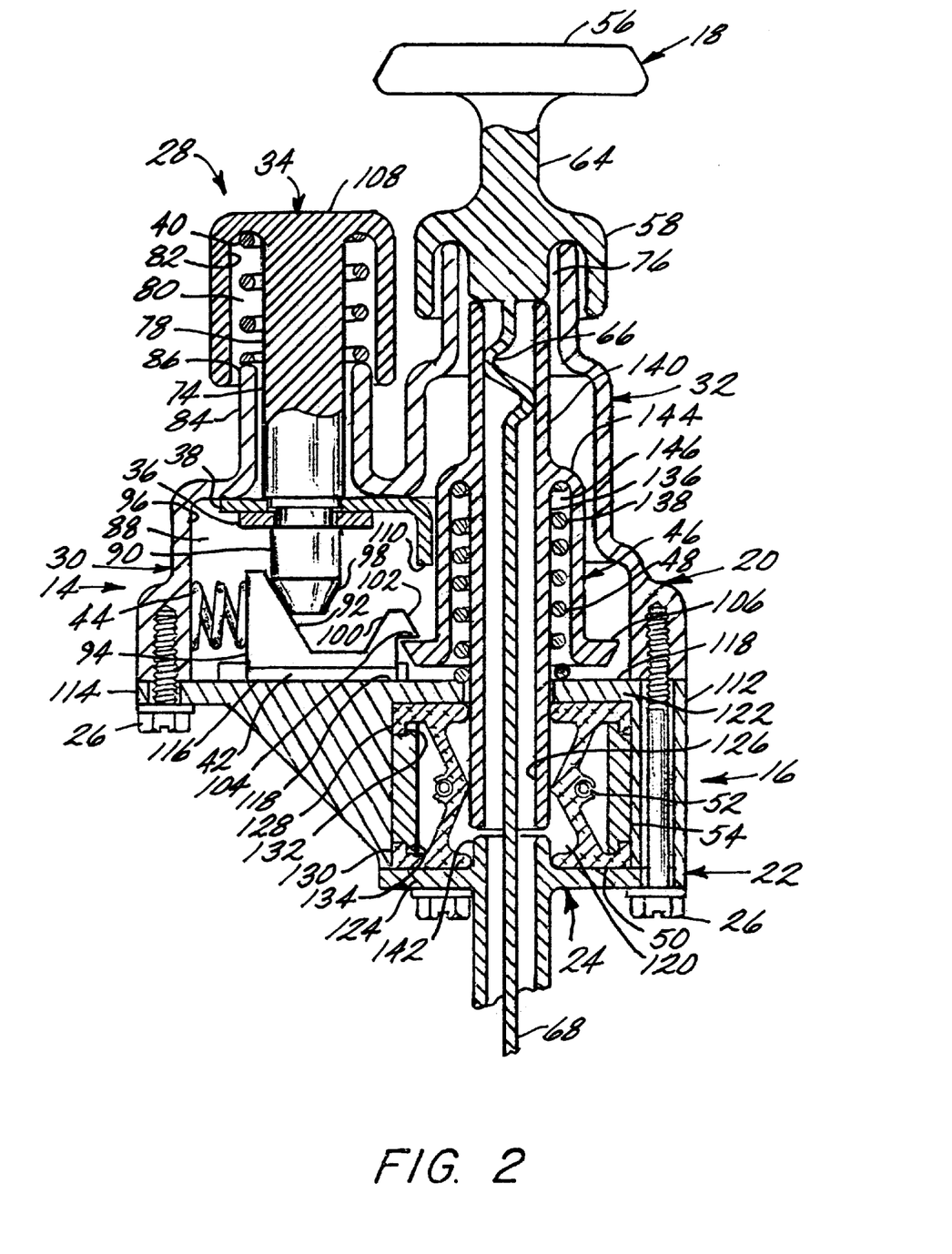
FIG. 2 is a longitudinal cross-sectional elevation view along the center line 2—2 of FIG. 1 in the normal locked engine mode position.

Referring to FIGS. 1 and 2, the dipstick device with integral wiping system of the present invention is shown generally at 10. For brevity purposes, the dipstick device with integral wiping system 10 will be referred to hereinafter as just simply, system 10. System 10 is comprised basically of four subassemblies or elements; (1) exterior housing assembly 12; (2) wipe assembly 14; (3) elastomeric wiping assembly 16 and (4) dipstick 18.

Exterior housing assembly 12 is comprised of an upper housing 20, a lower housing 22, a dipstick tube extension 24 and housing fasteners 26. Exterior housing assembly 12 will be discussed in detail hereinafter (see FIG. 2).

Turning now to FIG. 2, wipe assembly 14 is comprised of a wipe button assembly 28; a cam latch assembly 30 and a tube guide assembly 32. Wipe button assembly 28 and cam latch assembly 30 act as a setting mechanism for setting tube guide assembly 32 in a first and a second position.

Wipe button assembly 28 is comprised of a wipe button 34, a retaining clip 36, an antispring back tang 38 and wipe button return spring 40. The assembly and materials for wipe button assembly 28, cam latch assembly 30 and tube guide assembly 32 will be discussed in detail hereinafter during the detailed discussion of exterior housing assembly 12. Cam latch assembly 30 is comprised of cam latch 42 and cam latch return spring 44. Tube guide assembly 32 is comprised of a tube guide 46 (a movable member )and a tube guide return spring 48.

Elastomeric wiping assembly 16 is comprised of an elastomeric wiping element 50, an elastomeric wiping element spring 52 and an elastomeric wiping element seat 54. As with wipe assembly 14 discussed above, the assembly and materials for elastomeric wiping assembly 16 will be discussed hereinafter during the detailed discussion of exterior housing assembly 12.

Figure 3:
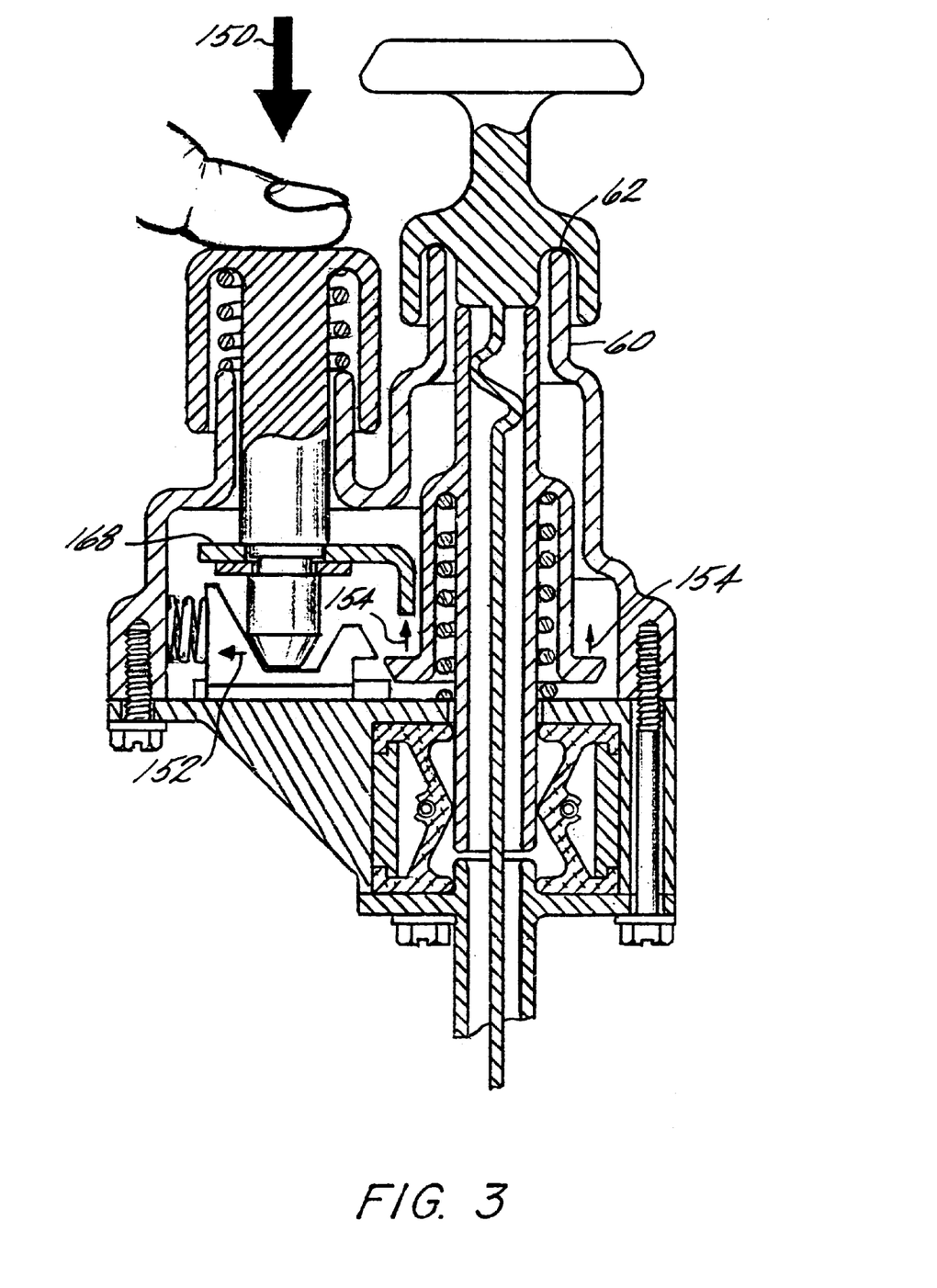
FIG. 3 is a longitudinal cross-sectional elevation view along the center line 2—2 of FIG. 1 showing the movement and location of the internal parts after depressing the "wipe button"
Figure 4:
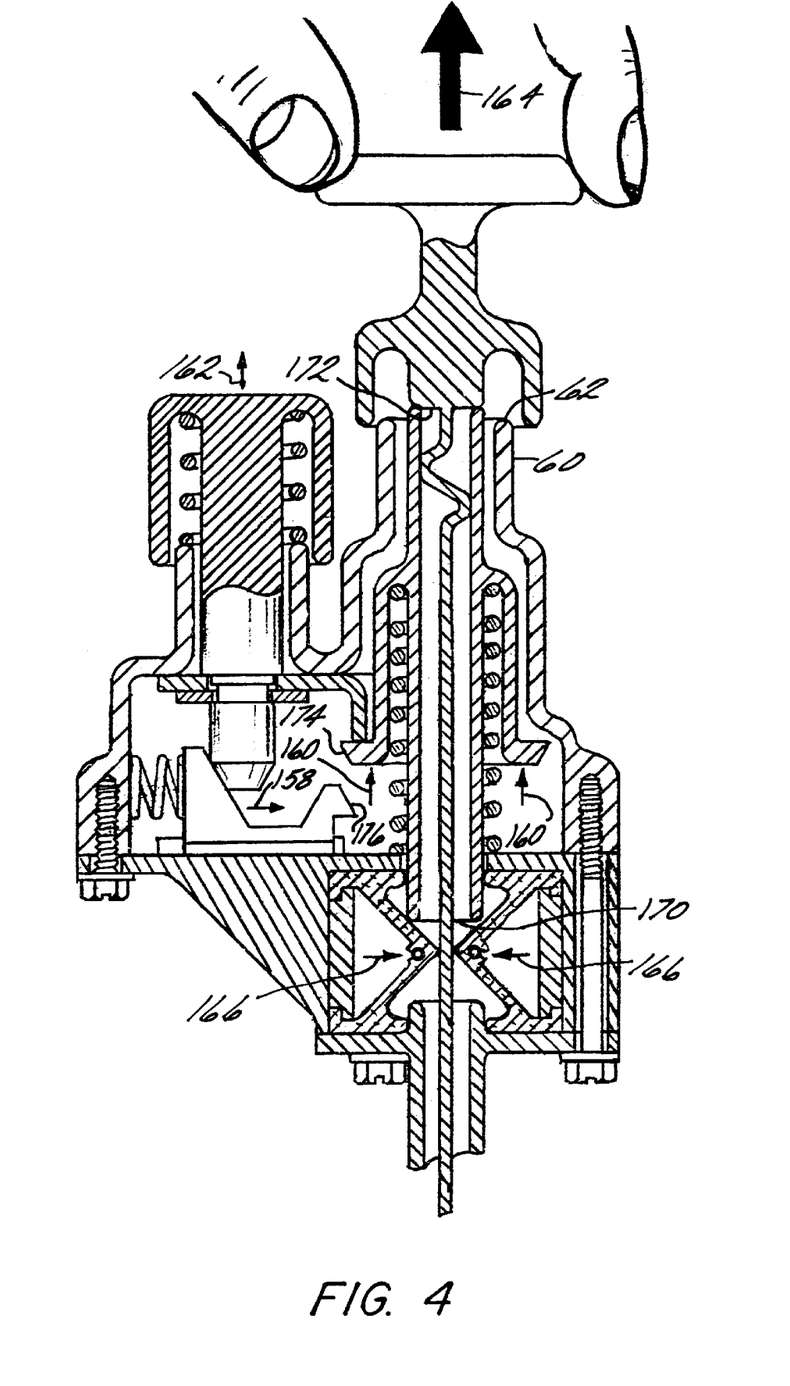
FIG. 4 is a longitudinal cross-sectional view along the center line 2—2 of FIG. 1 showing the movement and location of the internal parts after withdrawal of the dipstick has been allowed enough movement to allow automatic wiping of the dipstick and automatic reset of the "wipe" button to be able to return to the normal locked engine mode position as shown in FIG. 2.

Dipstick 18 is comprised of a handle segment 56, a shoulder segment 58 (see FIG. 2) which engages a protrusion 60 when engaged and seated on surface 62 of upper housing 20 (see FIGS. 3 and 4). There is a small diameter shank 64 between handle segment 56 and shoulder segment 58 to allow convenient grasping of the handle 56 when removing dipstick 18 for inspection. Bent segment 66 (see FIG. 2) known in the industry for elimination of vibration noise when an engine is running is provided as shown. Straight shank segment 68 is sized to length to assure segment 70 (see FIG. 1) measures the level of the crank case oil properly when dipstick 18 is fully engaged as discussed hereinbefore.

The bent segment 70 of the dipstick and the bent segment 72 as shown at the bottom of FIG. 1 may be straight, angled or of any curve to suit the particular engine so that the engaged segment 70 shows the correct crank case oil level and at the same time assures that handle segment 56 is at a convenient location for the operator. It should be noted that segments 66, 68 and 70 can be of circular or semi-circular cross-section as well as having bent, waved or helix configurations and may be capable of any radial position insertion; that is, it should not matter which way the segments 66, 68 and 70 are inserted into the upper housing 20. For instance, in practice, that portion of the dipstick that would be required to enter the bent portion of dipstick tube extension 24 as shown in FIG. 1 would require either a flexible segment or other accommodation to easily go through segment 72 as shown and as is known in the industry. Suitable materials and manufacturing methods are also well known and available in the industry to compensate for such configuration in dipstick tube extension 24 as shown by segment 72 in FIG. 1.

As stated hereinbefore, exterior housing assembly 12 is comprised of an upper housing 20, a lower housing 22 and a dipstick tube extension 24. Suitable known gaskets or gasketing material or other known sealing methods are used when assembling upper housing 20, lower housing 22 and dipstick tube extension 24 together. Suitable length screws 26 as required of known type in the industry are used to assembly system 10 together. It should be noted that any other suitable method known to the industry can be used such as brazing, welding etc. to assemble items 20, 22 and 24, along with the rest of the internal parts together.

Upper housing 20 preferably has two separate open hollow cylindrical spaces 74 and 76 spaced apart. Space 74 is sized to accommodate the O.D. shank 78 of wipe button 34. Wipe button 34 has an annular space 80, whose I.D. 82 can freely slide by the O.D. 84 of cylindrical hollow space 74. Wipe button return spring 40 is sized to fill annular space 80 and rest on a surface 86 at the top of cylindrical and hollow space 74.

Downwardly, cylindrical hollow space 74 opens up to a rectangularly shaped chamber 88 sized in length and width to accommodate the chamfered shank end 90 upon which anti spring back tang 38 is mounted and locked inside chamber 88 by retaining clip 36. Cam latch assembly 30, comprised of cam latch 42 and cam latch return spring 44 are mounted inside chamber 88 so that chamfered shank end 90 makes contact with the angled surface 92 of cam latch 42. Cam latch return spring 44 is mounted between the seating surface 94 of cam latch 42 and the opposing interior wall 96 of chamber 88. Thus, as wipe button 34 is pressed down, the chamfered surface 98 at the end of chamfered shank end 90 slides downwardly, cam latch 42 is forced to move in the direction of cam latch return spring 44 compressing cam latch return spring 44. Opposite angled surface 92 of cam latch 42 and fabricated as a part of cam latch 42 is chamfered latch portion 100, which at its front leading end, has an angled surface 102 abruptly ending as a retaining lip 104, which is sized to retain flange 106 of tube guide 46, where assembly and action will be discussed hereinafter.

Turning now to a discussion of the hollow cylindrical space 76 area and assembly of tube guide assembly 32, hollow cylindrical space 76 preferably starts at a level near the level of top surface 108 which is the top surface of wipe button 34. Note that protrusion 60 (see FIG. 3) referred to hereinbefore, when dipstick 18 was discussed, is actually the outer surface of hollow cylindrical space 76.

At the level where hollow cylindrical space 74 beings, hollow cylindrical space 76 increases in diameter and is sized so as to accommodate the moving action of tube guide assembly 32. At about the level of surface 110 of anti spring back tange 38, the diameter of hollow cylindrical space 76 is further increased to accommodate the movement of flange 106 of tube guide 46. The bottom surface 112 of cylindrical space 76 matches up and is the same as bottom surface 114 of rectangularly shaped chamber 88 and upon which the bottom surface 116 of cam latch 42 slides back and forth. This surface 112, 114 is coincident and coincides with the top surface 118 of lower housing 22 except for any possible gasketing material thickness. In fact, both the cam latch 42 and the tube guide return spring 48 rest on the top surface 118 of lower housing 22.

Top surface 118 of lower housing 22 extends to mate and matches up with the entire length of bottom surface 114 and bottom surface 112. Centered under cylindrical space 76 beneath a suitable wall thickness 122 is a cylindrical cavity 120 which is sized to hold elastomeric wiping assembly 16 which is comprised of elastomeric wiping element 50, elastomeric wiping element spring 52 and elastomeric wiping element seat 54 as hereinbefore listed above.

Figure 5:
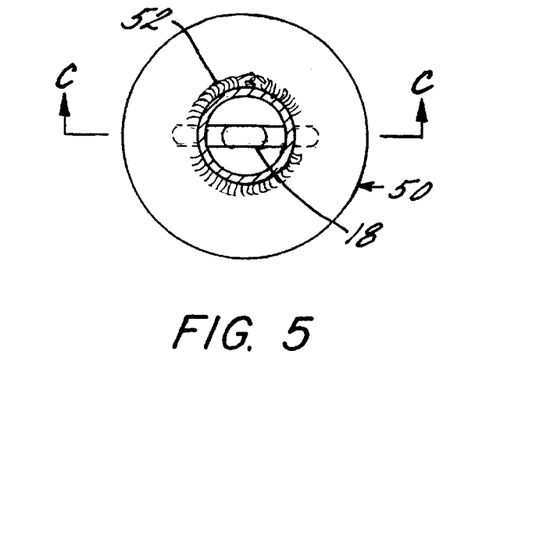
FIG. 5 is a cross-sectional plan view of a planar cut taken along section line 5—5 of FIG. 1 rotated 90° showing the elastomeric wiping element before the insertion of a dip stick.
Figure 6:
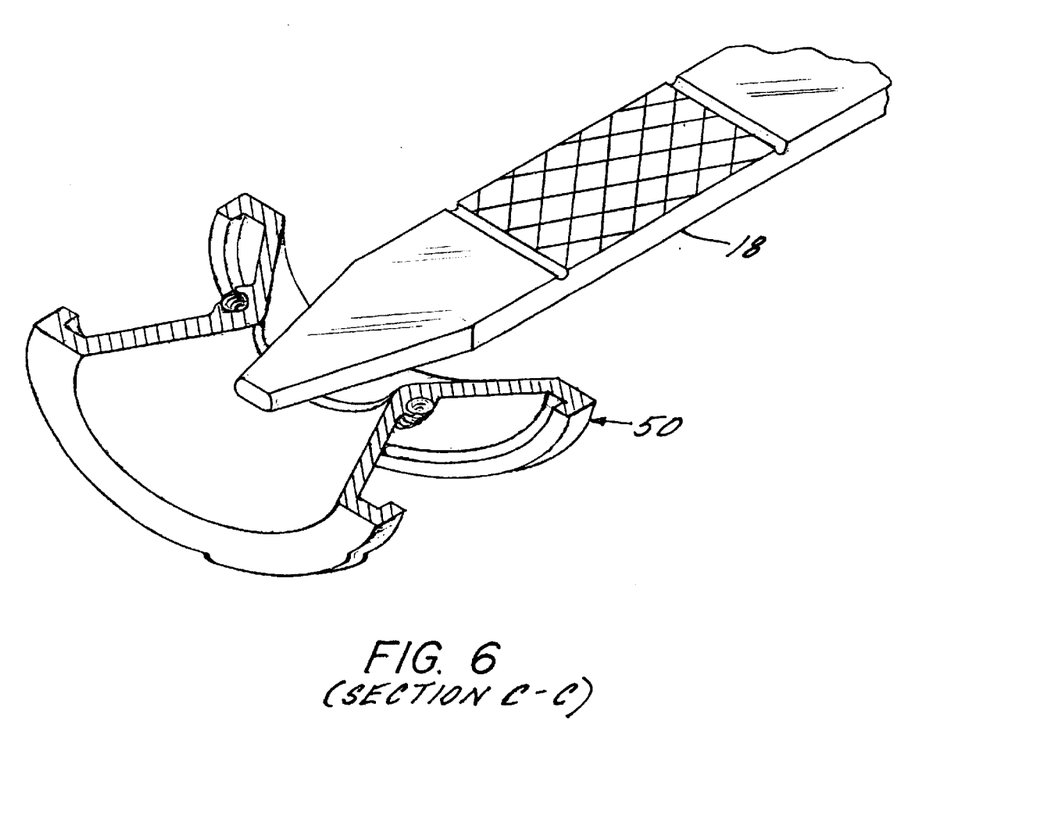
FIG. 6 is a perspective view of a cross-sectional view taken along section line C—C of FIG. 5 showing the elastomeric wiping element before the insertion of a dip stick.
Figure 9:
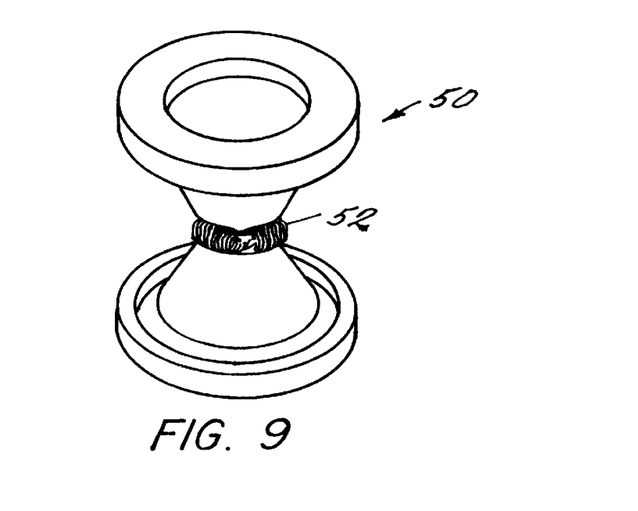
FIG. 9 is a perspective view of the elastomeric wiping element and the elastomeric wiping element spring.

Mounted to the bottom surface 124 of lower housing 22 and therefore closes in cylindrical cavity 120 to retain elastomeric wiping assembly 16 in place. Turning now to FIG. 5, the elastomer wiping element 50 and elastomer wiping element spring 52 are illustrated before the insertion of dipstick 18 into the elastomer wiping element 50. Elastomeric wiping element spring 52 applies a radial pressure to the elastomer wiping element 50. Now turning to FIG. 6, note that elastomeric wiping element 50 is basically "X" shaped in cross-section, that is, the elastomeric wiping element spring 52 surrounds the middle of the "X" shape 360° around and, thus, applies a radial pressure to the wiping surface 126 (see FIGS. 2 and 9). Elastomeric wiping element 50 has shoulders 128 and 130 at both ends wherein elastomeric wiping element seat 54 retains elastomeric shoulders 128, 130 under lips 132 and 134 of elastomeric wiping element seat 54 so as to keep the shoulders 128, 130 at the periphery of cylindrical cavity 120 so that wiping surface 126 is free to meet in the axis of cylindrical cavity 120.

Figure 7:
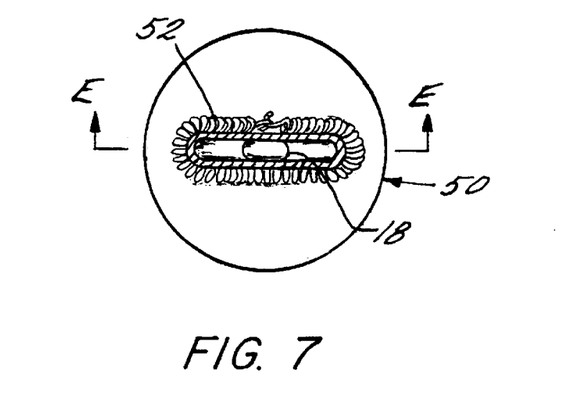
FIG. 7 is a cross-sectional plan view of a planar cut taken along section line 5—5 of FIG. 1 rotated 90° showing the elastomeric wiping element after the insertion of a dip stick.
Figure 8:
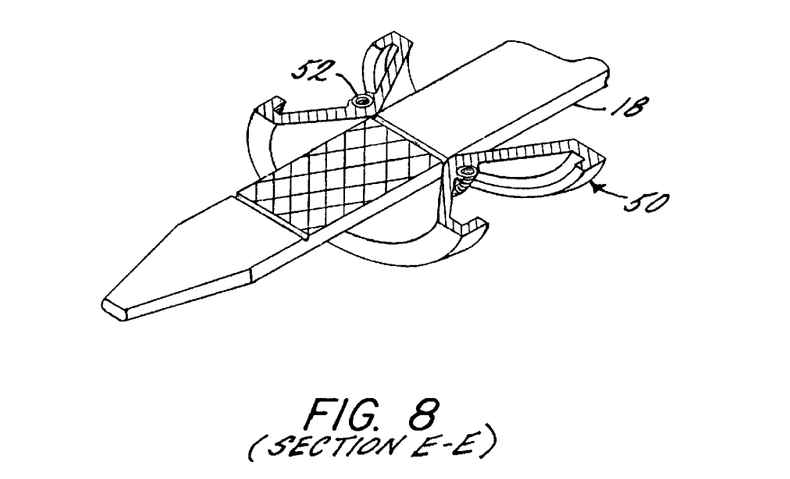
FIG. 8 is a perspective view of a cross-sectional view taken along section line E—E of FIG. 7 showing the elastomeric wiping element after the insertion of a dip stick.

Now turning to FIGS. 7, and 8 the elastomer wiping element 50 and elastomer wiping clement spring 52 are illustrated after the insertion of dipstick 18 into the elastomer wiping element 50. As dipstick 18 is inserted into tube guide 46 and in the direction opposite the direction of arrow 164, the wipe surface 126 of the elastomeric wiping element 50 moves outwardly in the direction opposite of the direction of arrows 166 away from the axis of cylindrical cavity 120 (see FIGS. 1 and 4). As illustrated in FIG. 7, elastomeric wiping element spring 52 is so designed as to be capable of contacting any shaped dipstick whether round, semiround, flat, or of any possible shape known to the industry because the 360° radial design of elastomeric wiping element spring 52.

Wall thickness 122 of lower housing 22 is drilled, formed, cast or otherwise fabricated on the axis of cylindrical cavity 120 sized to a diameter that is larger than the stem O.D. diameter 136 of tube guide 46 but smaller than the O.D. 138 of tube guide return spring 48 whose end coil rests on top surface 118 of lower housing 22. The length of the inner stem tube portion 140 preferably extends from the middle portion of the smallest diameter of cylindrical space 76 downwardly approximately three fourths of the way through cylindrical cavity 120 where inner stem tube portion 140 extends downwardly in close proximity to dipstisk tube extension 24 continues downwardly as necessary as is required so as to locate both handle segment 56 of dipstick 18 and wipe button surface 108 at a convenient location for the operator when an oil dipstick check is to be made.

Tube guide 46 has a bell shape portion 144 sized with an annular space 146 inside the bell shape portion 144 to properly preload tube guide return spring 48 and allow tube guide return spring 48 to move freely inside the annular space 146. At the end of bell shape portion 144 is a flange 106 designed to fit under straight surface 104 when dipstick 18 is in its non operating position.

Wipe button return spring 40, cam latch return spring 44, tube quick return spring 48 and elastomeric wiping element spring 52 are all preferably coil springs made of a steel material of suitable temper and size. Elastomeric wiping element 50 basically has an "X" cross-section and is comprised of two frusto-conical segments (both on the I.D. and O.D. surfaces) that extend half way through to the "X" from each end and is preferably made of petroleum compatible elastomeric material. The housing is preferably made of a plastic material and die cast or any other suitable known method may be used. Of course, plastic material such as polypropylene may be used wherever suitable. The chamfered shank end 90 of wipe button 34 and cam and latch 42 are preferably made from polyethylene material. It should be noted that any other suitable known materials and/or methods of fabrication may be used to manufacture and assemble system 10.

Now turning to FIGS. 2, 3 and 4, the operation of system 10 will be discussed in detail. FIGS. 2 and 3 show dipstick 18 in the position where either the engine is running or is in the non-operating condition. Note that bent segment 66 keeps the dipstick securely in place when shoulder 58 is tight or snug against the upper surface 62 of hollow cylindrical space 76 (see FIGS. 2 and 3). When it is desired to check the oil level in the engine crank case wipe button 34 is pushed downwardly shown by arrow 150, compressing wipe button return spring 40, and, at the same time forcing chamfered surface 98 to slide along angled surface 92 which makes cam and latch 42 move in the direction of arrow 152 compressing cam and latch return spring 44. As soon as lip 104 of cam and latch 42 clears surface 106 of tube guide 46, tube guide return spring 48 moves the entire tube guide 46 in the direction of arrows 154. As can be see in FIG. 4, anti spring back tang 38 stops tube guide 46, tube guide return spring 48 moves the entire tube guide 46 quickly enough so that cam and latch return spring 44 can return cam and latch 42 immediately in the direction of arrow 158 as shown in FIG. 4.

In FIG. 4, arrows 160 have moved the lube guide 46 to its limit because of contact surface 110 (see FIG. 2) contacting the top side 168 of anti spring back tang 38. Also in FIG. 4, wipe button 34 returns to its inoperative position as shown by arrow 162. As dipstick 18 is grasped by handle segment 56 and pulled up and out of tube guide 46 in the direction of arrow 164, wipe surface 126 of elastomeric wiping element 50 moves inwardly in the direction of arrows 166 towards the axis of cylindrical cavity 120. Tube guide 46 has moved sufficiently in the direction of arrows 160 to create a sufficient spacing between the bottom end 170 of tube guide 46 and protrusion 142 of dipstick tube extension 24.

Wipe surface 126 of elastomeric wiping element 50 continues to wipe clean dipstick 18 of any adhering motor oil and the wiped oil drains back into the crank case via dipstick extension 24. It should be noted that the elastomeric wiping element spring 52 is so designed as to be capable of contacting any shaped dipstick whether round, semiround, flat or of any possible shape known to the industry because of its 360° radial design.

After the dipstick 18 has been withdrawn and wiped automatically by elastomeric wiping element 50, dipstick 18 is then reinserted and pushed downwardly to seat the dipstick handle segment 56 as shown in FIGS. 2 and 3. Shoulder surface 172 (see FIG. 4) is of sufficient diameter so as to be equal to or greater than the O.D. of inner stem tube portion 140 of tube guide 46. As dipstick 18 is inserted further, shoulder surface 172 forces tube guide 46 downwardly until inner stem tube portion 140 meets protrusion 142 of dipstick extension 24. This action causes wiping surface to rest radially against inner tube portion 140 of tube guide 46. Dipstick 18 is pushed downwardly until the dipstick handle shoulder is firmly seated on surface 62 of hollow cylindrical space 76.

Since the inner tube portion 140 keeps wiping surface 126 radially against its O.D. surface, the dipstick 18 may be withdrawn again and the oil level of the crank case examined by inspecting segment 70 of dipstick 18 after this withdrawal for inspection. Additionally, it should be noted that surface 174 of tube guide 46 slides by surface 176 of cam and latch 42 to automatically lock flange 106 of tube guide 46 in place under lip 104 of cam and latch 42. After the inspection above has been made, dipstick 18 is reinserted as before and nothing more need be done until the next inspection.

In summary, the advantages of the present dipstick invention over most prior art dipstick systems is that in the prior art, a wiping medium had to be found, the dipstick removed and wiped, the dipstick reinserted to determine the oil level and then withdrawn for inspection followed by reinsertion with the wiping medium discarded and removed for reprocessing of the oil residues.

Advantageously with the present invention, the dipstick is wiped and the oil residue returned automatically to the engine upon the first dipstick removal. Then the dipstick need by only reinserted and then removed for inspection before finally returning the dipstick. Additionally, there is no need for expensive disposal or processing of a wiping medium.

Still other important features of the present invention include:

1. There is an automatic reset mode; that is the ability for the apparatus to reset itself after the wiping sequence;
2. excellent wear compensation; that is, the apparatus is able to effectively wipe the dipstick surfaces even after consequential material wear;
3. the apparatus is capable of one hand operation at all times;
4. the apparatus is capable of any radial position insertion in lieu of a "keyed" position insertion;
5. the apparatus can accommodate a dipstick with a circular or semi circular cross section;
6. the apparatus can accommodate bent, waved or helixed dipstick configurations since such configurations are incorporated to constrain dipstick movement from vibration during engine operation;
7. the apparatus can tolerate helical hand motion imparted to the dipstick during removal and insertion;
8. the apparatus can accommodate long lengths and bends so as to locate the dipstick handle at a convenient location for the operator;
9. the apparatus can prevent a capillary effect on the dipstick reading; and
10. the apparatus can result in a "dry stick" which assures the oil level reading did not result from splashed oil.

It will be appreciated that none of the aforementioned prior art patents provide the above-combination of important features.

While preferred embodiments have been shown and described, various modifications and substitutions may be made thereto without departing from the spirit and scope of the invention. Accordingly, it is to be understood that the present invention has been described by way of illustrations and not limitation.

What is claimed is:

1. A dipstick device with an integral wiping system for use in measuring a fluid level in a reservoir, comprising:

an exterior housing assembly;

a wipe assembly disposed within the exterior housing assembly;

an elastomeric wiping assembly disposed within the exterior housing assembly comprising an elastomeric wiping element and an elastomeric wiping element spring, the elastomeric wiping element having a first end, a second end, and a middle section therebetween, the elastomeric wiping spring element disposed about the middle section of the elastomeric wiping element inwardly biasing the middle section, the elastomeric wiping element adapted to receive a dipstick in a first direction such that when the dipstick is moved in an opposite direction outwardly relative to the elastomeric wiping element, the dipstick is in intimate contact with the elastomeric wiping element, wherein the wipe assembly comprises a wipe button assembly, a cam latch assembly, and a tube guide assembly having a movable tube guide, the wipe button assembly having a wipe button and a wipe button return spring in intimate contact with the wipe button, the cam latch assembly having a cam latch and a cam latch return spring, the cam latch and cam latch spring disposed within the exterior housing, the cam latch adapted to move in an inward and an outward direction, the cam latch being in intimate contact with the cam latch spring and capable of compressing the spring, the wipe button assembly actuating the cam latch assembly by moving the cam latch in the outward direction thereby compressing the cam latch spring and thereby releasing the movable tube guide so that the elastomeric wiping element spring inwardly biases the middle section of the elastomeric wiping element and thereby the dipstick is in intimate contact with the elastomeric wiping element wherein fluid is removed therefrom by contact with the elastomeric wiping element when the dipstick is moved in the opposite direction.

2. The device of claim 1, wherein the wipe button assembly has an antispring back tang for stopping the movement of the tube guide when the tube guide is released, the tube guide having a tube guide return spring to facilitate movement of the tube guide so that the cam latch and cam latch return spring move in the inward direction.

3. The device of claim 1, wherein
the exterior housing assembly comprises an upper housing, a lower housing and a dipstick tube extension, the upper and lower housings being secured to one another by housing fasteners, the upper housing having two separate hollow cylindrical openings, one of the cylindrical openings adapted to receive the wipe assembly and the other adapted to receive tube guide assembly for insertion and removal of a dipstick.

4. The device of claim 1, wherein
the dipstick is semispherical in cross-section and includes a flat surface on which fluid level markings are located, the elastomeric wiping element adapted to receive the dipstick slidably extending through the elastomeric wiping element in frictional contact therewith, thereby wiping the dipstick.

5. The device of claim 1, wherein
the dipstick comprises a handle segment, a shoulder segment, a bent portion, and a straight shank segment of sufficient length to measure the fluid level in the reservoir.

6. A dipstick device with an integral wiping system for use in measuring a fluid level in a reservoir, comprising:
an exterior housing assembly;
a wipe assembly disposed within the exterior housing assembly;
an elastomeric wiping assembly disposed within the exterior housing assembly, the elastomeric wiping assembly having an elastomeric wiping element and an elastomeric wiping element spring, the elastomeric wiping element spring applying a pressure to a wiping portion of the elastomer wiping element;
an elongated dipstick extending through the elastomeric wiping element; and
a movable member having a central opening receiving the elongated dipstick, the movable member being positionable in a first position for preventing contact between the elastomeric wiping element and the elongated dipstick and in a second position for allowing frictional contact between the wiping portion of the elastomeric wiping element and the dipstick.

7. The device of claim 6, wherein
the exterior housing assembly comprises an upper housing, a lower housing and a dipstick tube extension, the upper and lower housings being secured to one another by housing fasteners, the upper housing having two separate hollow cylindrical openings, one of the cylindrical openings adapted to receive the wipe assembly and the other adapted to receive movable member for insertion and removal of a dipstick.

8. The device of claim 6, wherein
the dipstick being semispherical in cross-section and includes a flat surface on which fluid level markings are located, the elastomeric wiping element adapted to receive the dipstick slidably extending through the elastomeric wiping element in frictional contact therewith, thereby wiping the dipstick.

9. The device of claim 6, wherein
the dipstick comprises a handle segment, a shoulder segment, a bent portion, and a straight shank segment of sufficient length to measure the fluid level in the reservoir.

10. The device of claim 6, wherein in the first position, the movable member is disposed between a portion of the elastomeric wiping element and the dipstick for preventing contact therebetween.

11. The device of claim 6, wherein in the second position, the movable member is disposed between the elastomeric wiping element and the dipstick such that the wiping portion of the elastomeric wiping element contacts a portion of the elongated dipstick by the pressure exerted by elastomeric wiping spring to the elastomeric wiping element.

12. The device of claim 6, wherein the movable member comprises a spring loaded movable tube guide having a flange wherein in the first position, the movable tube guide is retained by a complementary latch assembly which is a part of the wipe assembly.

13. The device of claim 12, wherein in the second position the movable tube is released by disengaging the flange from the latch, thereby causing the spring loaded movable tube guide to be released from the latch assembly resulting in the elastomeric wiping element spring inwardly biasing the wiping portion of the elastomeric spring element so that the wiping portion is in frictional contact with the elongated dipstick.

14. The device of claim 13, wherein the latch assembly comprises:
a cam latch assembly having a cam latch and a cam latch return spring, the cam latch and cam latch spring being disposed in an upper portion of the exterior housing, the cam latch being in intimate contact with the cam latch spring and capable of compressing the cam latch spring, wherein the cam latch moves in an inward and outward direction, wherein movement of the cam latch in the outward direction compresses the cam latch spring and releases the movable tube guide from its first position of being retained by the cam latch.

15. A dipstick device with an integral wiping system for use in measuring a fluid level in a reservoir, comprising:
an exterior housing assembly;
a wipe assembly disposed within the exterior housing assembly;
an elastomeric wiping assembly disposed within the exterior housing assembly, the elastomeric wiping assembly having an elastomeric wiping element and an elastomeric wiping element spring, the elastomeric wiping element spring applying a pressure to a wiping portion of the elastomer wiping element;
an elongated dipstick extending through the elastomeric wiping element;
a movable member having a central opening receiving the elongated dipstick, the movable member being positionable in a first position for preventing contact between, the elastomeric wiping element and the elongated dipstick and in a second position for allowing frictional contact between the wiping portion of the elastomeric wiping element and the dipstick, wherein in the first position, the movable member is disposed between a portion of the elastomeric wiping element and the dipstick and in the second position the movable member is disposed between the elastomeric wiping element such that the wiping portion of the elastomeric wiping element contacts the elongated dipstick by the pressure exerted by elastomeric wiping spring to the elastomeric wiping element; and
a setting mechanism for retaining the movable member in the first position and for releasing the movable member to the second position, wherein in the first position, a latch of the setting mechanism engages a flange of the movable member to retain the movable member in the first position and in the second position, the actuation of the setting mechanism releases the latch from the flange.

* * * * *

UNITED STATES PATENT AND TRADEMARK OFFICE
CERTIFICATE OF CORRECTION

PATENT NO.    : 6,029,509
DATED         : February 29, 2000
INVENTOR(S)   : Singarella et al.

It is certified that error appears in the above-identified patent and that said Letters Patent is hereby corrected as shown below:

Title page,
Item [54], Title, after "WITH" delete "INTERGRAL" and insert therefor
-- INTEGRAL --.

Column 6,
Line 44, after "case" insert -- , --.
Line 52, after "be" delete "see" and insert therefor -- seen --.
Line 58, after "the" delete "lube" and insert therefor -- tube --.

Column 10,
Line 46, after "between" delete ",".

Signed and Sealed this

Eleventh Day of February, 2003

JAMES E. ROGAN
*Director of the United States Patent and Trademark Office*